US012585273B2

(12) United States Patent (10) Patent No.: US 12,585,273 B2
Obara et al. (45) Date of Patent: Mar. 24, 2026

(54) CONTROL SYSTEM FOR HAULING VEHICLES

(71) Applicant: HITACHI CONSTRUCTION MACHINERY CO., LTD., Tokyo (JP)

(72) Inventors: Hiroki Obara, Tokyo (JP); Masaki Kanai, Tokyo (JP); Mikio Bando, Tokyo (JP); Shinichi Uotsu, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 265 days.

(21) Appl. No.: 18/029,148

(22) PCT Filed: May 26, 2021

(86) PCT No.: PCT/JP2021/020074
§ 371 (c)(1),
(2) Date: Mar. 29, 2023

(87) PCT Pub. No.: WO2022/070504
PCT Pub. Date: Apr. 7, 2022

(65) Prior Publication Data
US 2023/0367323 A1 Nov. 16, 2023

(30) Foreign Application Priority Data
Sep. 30, 2020 (JP) ................................ 2020-165476

(51) Int. Cl.
*G05D 1/00* (2024.01)
*B60W 40/068* (2012.01)
(52) U.S. Cl.
CPC ......... *G05D 1/0217* (2013.01); *B60W 40/068* (2013.01); *G05D 1/0223* (2013.01);
(Continued)

(58) Field of Classification Search
CPC .. G05D 1/0217; G05D 1/0223; G05D 1/0274; G05D 1/0214; G05D 1/0297;
(Continued)

(56) References Cited

U.S. PATENT DOCUMENTS

2001/0029419 A1* 10/2001 Matsumoto ......... B60W 40/068
701/80
2009/0037064 A1* 2/2009 Nakamura ........... B60W 40/112
701/70
(Continued)

FOREIGN PATENT DOCUMENTS

JP 2011107793 A 6/2011
JP 2013196051 A 9/2013
(Continued)

OTHER PUBLICATIONS

International Search Report of PCT/JP2021/020074 dated Jul. 13, 2021.

*Primary Examiner* — Jelani A Smith
*Assistant Examiner* — Alyssa Rorie
(74) *Attorney, Agent, or Firm* — MATTINGLY & MALUR, PC

(57) ABSTRACT

Provided is a control system for hauling vehicle capable of suppressing slippage of a hauling vehicle while suppressing a decrease in travel speed of the hauling vehicle. A control system for hauling vehicle causes a hauling vehicle 100 to travel based on a control target including a target route. The control system generates a control target based on the map information, which includes information on the travel path WP along which the hauling vehicle 100 travels and information on a plurality of travel sections TS obtained by dividing the travel path WP; the loading quantity on the hauling vehicle 100 in each travel section TS; and a slippage index indicating the slipperiness of the travel path WP in each travel section TS. If the slippage index SI of at least one (Continued)

travel section TS is less than the predetermined threshold, the control system sets a larger turning radius of the turning route included in the target route for that travel section TS than for the case where the slippage index is equal to or greater than the predetermined threshold.

11 Claims, 7 Drawing Sheets

(52) U.S. Cl.
CPC ..... *G05D 1/0274* (2013.01); *B60W 2300/125* (2013.01); *B60W 2552/40* (2020.02); *B60W 2555/20* (2020.02); *B60W 2556/40* (2020.02); *B60W 2556/45* (2020.02)

(58) Field of Classification Search
CPC ......... B60W 40/068; B60W 2300/125; B60W 2552/40; B60W 2555/20; B60W 2556/40; B60W 2556/45; B60W 2300/17; B60W 2520/10; B60W 2520/26; B60W 2556/50; B60W 30/045; B60W 30/18145; B60W 40/00–076; B60W 40/12; B60W 40/13; B60W 2040/1307; B60W 50/06; B60W 60/00–001
See application file for complete search history.

(56) References Cited

U.S. PATENT DOCUMENTS

| | | | | |
|---|---|---|---|---|
| 2010/0198474 A1* | 8/2010 | Shiiba | ................ | B60K 31/0066 |
| | | | | 701/70 |
| 2011/0118900 A1 | 5/2011 | Uchida et al. | | |
| 2011/0209521 A1* | 9/2011 | Shiozawa | ............... | B60T 8/172 |
| | | | | 73/9 |
| 2014/0358382 A1 | 12/2014 | Kou et al. | | |
| 2015/0094945 A1* | 4/2015 | Cheng | ................ | B60K 31/0066 |
| | | | | 701/408 |
| 2016/0280262 A1* | 9/2016 | Oyama | ................ | B62D 15/025 |
| 2018/0134152 A1* | 5/2018 | Nagayama | .......... | B60W 40/072 |
| 2019/0250624 A1* | 8/2019 | Sunil Kumar | ........ | G01C 21/26 |
| 2020/0192367 A1* | 6/2020 | Choi | ................... | G05D 1/0223 |
| 2022/0252416 A1* | 8/2022 | Wu | .................... | G01C 21/3492 |

FOREIGN PATENT DOCUMENTS

| | | |
|---|---|---|
| JP | 2019144841 A | 8/2019 |
| JP | 2019165665 A | 10/2019 |

* cited by examiner

Figure 5:
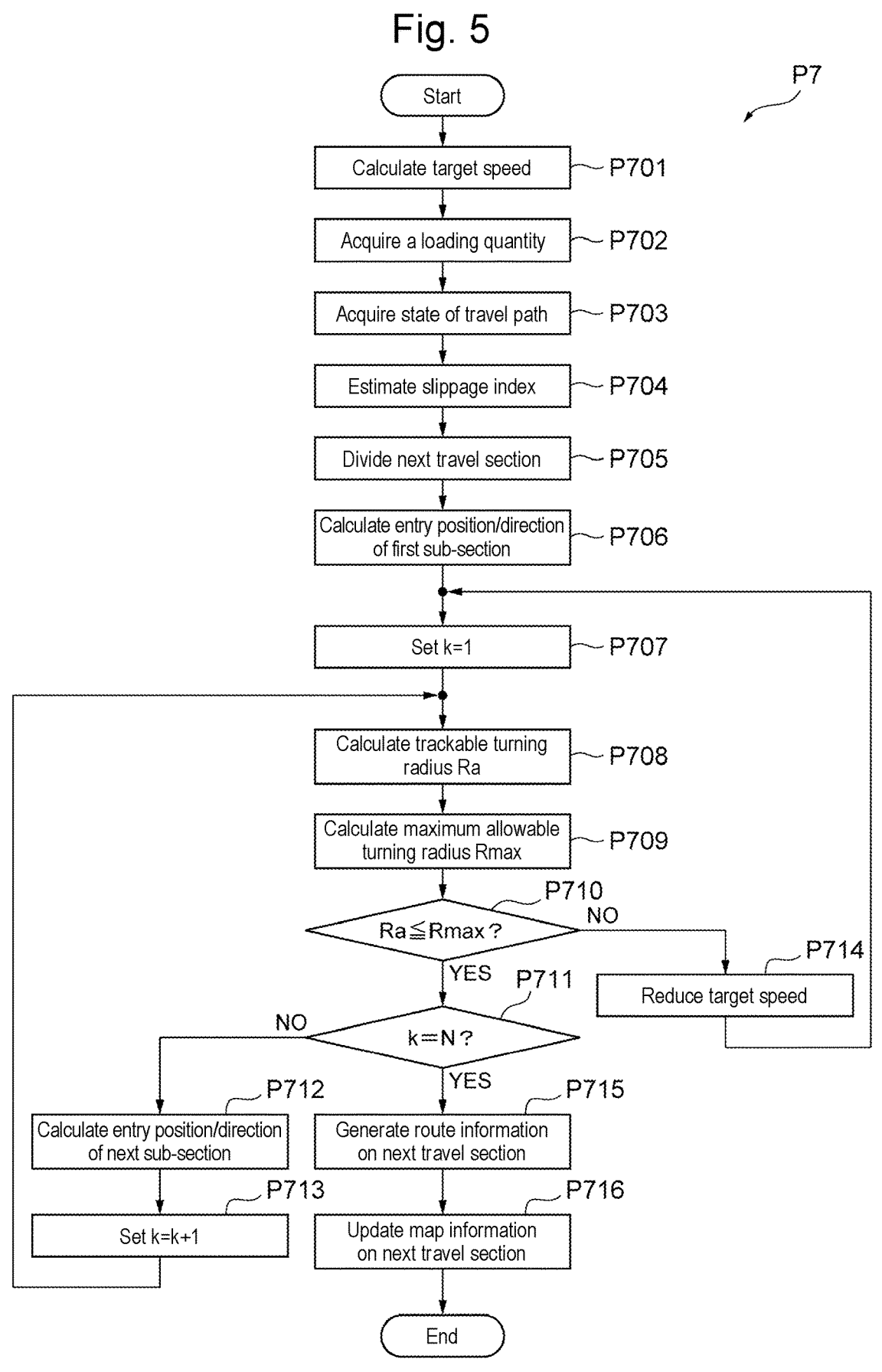

```
                    ( Start )
                        │
                        ▼
          ┌─────────────────────────┐
          │  Calculate target speed │──── P701
          └─────────────────────────┘
                        │
                        ▼
          ┌─────────────────────────┐
          │ Acquire a loading quantity│──── P702
          └─────────────────────────┘
                        │
                        ▼
          ┌─────────────────────────┐
          │ Acquire state of travel path│──── P703
          └─────────────────────────┘
                        │
                        ▼
          ┌─────────────────────────┐
          │  Estimate slippage index │──── P704
          └─────────────────────────┘
                        │
                        ▼
          ┌─────────────────────────┐
          │ Divide next travel section│──── P705
          └─────────────────────────┘
                        │
                        ▼
          ┌─────────────────────────────┐
          │ Calculate entry position/direction│──── P706
          │      of first sub-section   │
          └─────────────────────────────┘
                        │
                        ▼
                        ●◄──────────────────────────┐
                        │                            │
                        ▼                            │
          ┌─────────────────────────┐                │
          │        Set k=1          │──── P707        │
          └─────────────────────────┘                │
                        │                            │
                        ▼                            │
                        ●◄────────────┐              │
                        │             │              │
                        ▼             │              │
          ┌─────────────────────────┐ │              │
          │ Calculate trackable turning│──── P708     │
          │        radius Ra        │ │              │
          └─────────────────────────┘ │              │
                        │             │              │
                        ▼             │              │
          ┌─────────────────────────┐ │              │
          │ Calculate maximum allowable│──── P709     │
          │     turning radius Rmax │ │              │
          └─────────────────────────┘ │              │
                        │             │           P714│
                        ▼  P710       │    ┌──────────────────┐
                   ◇─────────◇  NO────────►│ Reduce target speed│
                   │ Ra≦Rmax? │           │    └──────────────────┘
                   ◇─────────◇             │
                        │ YES   P711       │
                        ▼                  │
            NO     ◇─────────◇             │
         ┌─────────│  k=N ?  │             │
         │         ◇─────────◇             │
         │              │ YES              │
         ▼  P712        ▼  P715            │
  ┌──────────────┐ ┌──────────────────┐    │
  │Calculate entry│ │ Generate route   │    │
  │position/direction│ information    │    │
  │of next sub-section│on next travel section│
  └──────────────┘ └──────────────────┘    │
         │ P713        │  P716             │
         ▼             ▼                   │
  ┌──────────────┐ ┌──────────────────┐    │
  │  Set k=k+1   │ │ Update map information│
  └──────────────┘ │ on next travel section│
         │         └──────────────────┘    │
         └──────►                │          │
                                 ▼          │
                             ( End )        │
```

$Ra \leqq Rmax$?

$k = N$?

CONTROL SYSTEM FOR HAULING VEHICLES

TECHNICAL FIELD

The present disclosure relates to control systems for hauling vehicles.

BACKGROUND ART

Inventions about systems for managing the operation of mining machines have been known (see Patent Literature 1 below). This operation control system for mining machine creates speed limit information based on travel path information and position information to change the speed limit when the mining machine travels on a travel path corresponding to the travel route information (see this Patent Literature, paragraph 0007, claim 1, abstract, for example). The travel path information includes at least information on the moisture content of the travel path, on which the mining machine working at the mine travels. The position information relates to the position in the travel path corresponding to the travel path information.

This operation control system for mining machine suppresses the slippage of the mining machine traveling on the travel path at the mine, thus preventing deterioration of the fuel consumption of the mining machine and also suppressing wearing of the tires (see this Patent Literature, paragraph 0023, for example).

CITATION LIST

Patent Literature

Patent Literature 1: JP 2013-196051 A

SUMMARY OF INVENTION

Technical Problem

In the above-mentioned conventional operation control system for mining machines, a mining machine such as a dump truck successively calculates the own position by means of a vehicle-mounted position information detector, while comparing the geographical information of the travel path included in the operation information with the own vehicle position information. Then, the mining machine travels at a travel speed (speed limit) set for each travel path so as not to deviate from the travel path (see this Patent Literature, paragraph 0054, for example). The travel speed of the mining machine therefore may be reduced more than necessary when the moisture content of the traveled path increases and the path becomes slippery.

The present disclosure provides a control system for hauling vehicle capable of suppressing slippage of a hauling vehicle while suppressing a decrease in travel speed of the hauling vehicle.

Solution to Problem

One aspect of the present disclosure relates to a control system for hauling vehicle that causes a hauling vehicle to travel based on a control target including a target route. The control system generates the control target based on map information, which includes information on a travel path along which the hauling vehicle travels and information on a plurality of travel sections obtained by dividing the travel path; a loading quantity on the hauling vehicle in each travel section; and a slippage index indicating slipperiness of the travel path in each travel section. If the slippage index of at least one of the travel sections is less than a predetermined threshold, the control system sets a larger turning radius of a turning route included in the target route for the travel section than for a case where the slippage index is equal to or greater than the predetermined threshold.

Advantageous Effects of Invention

The above-stated one aspect of the present disclosure provides a control system for hauling vehicle capable of suppressing slippage of a hauling vehicle while suppressing a decrease in travel speed of the hauling vehicle.

BRIEF DESCRIPTION OF DRAWINGS

FIG. 5 is a flowchart of the process to update the next travel section shown in FIG. 3.

DESCRIPTION OF EMBODIMENTS

Figure 1:
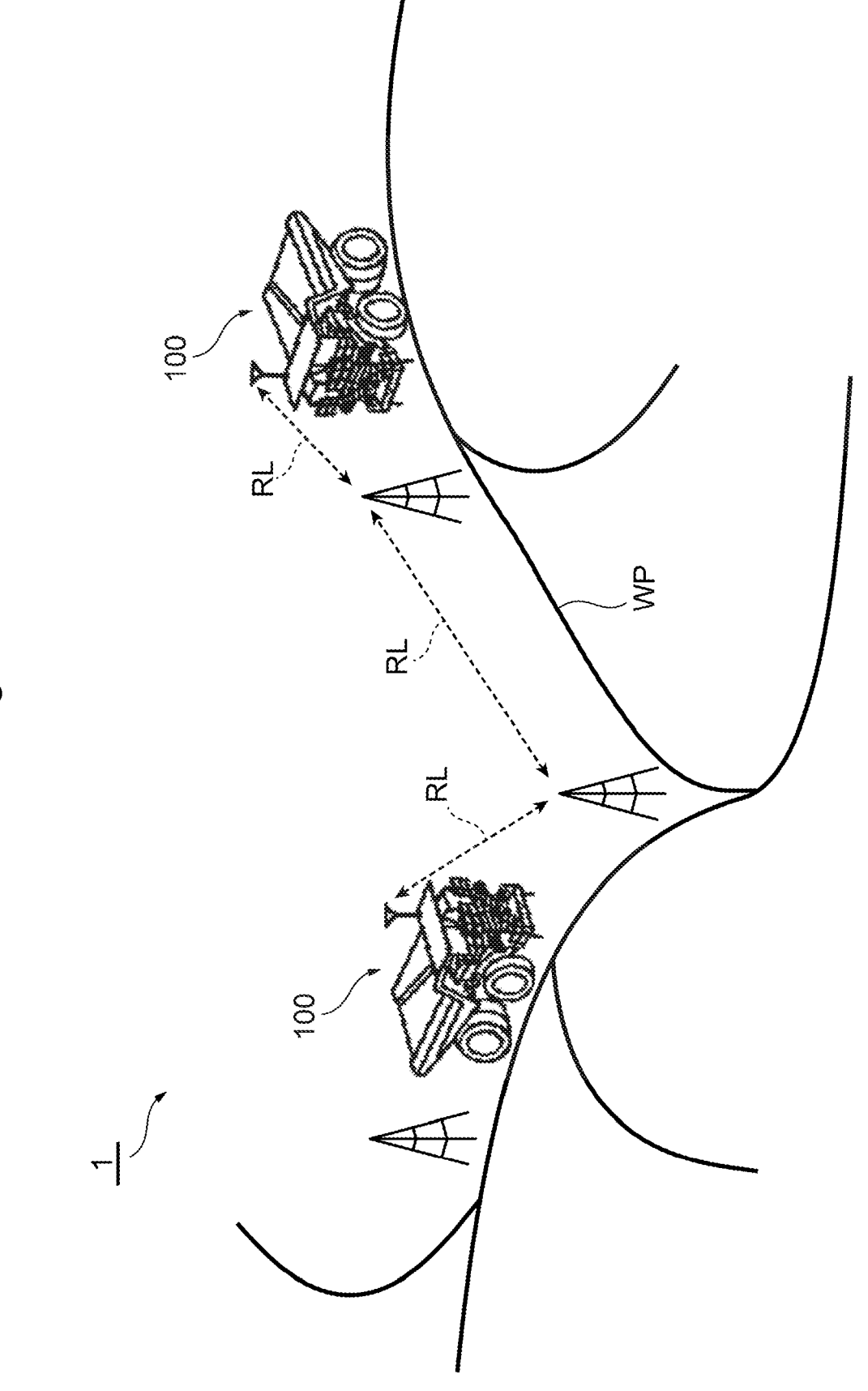
FIG. 1 is a schematic diagram of an embodiment of a control system for hauling vehicle of the present disclosure.
Figure 2:
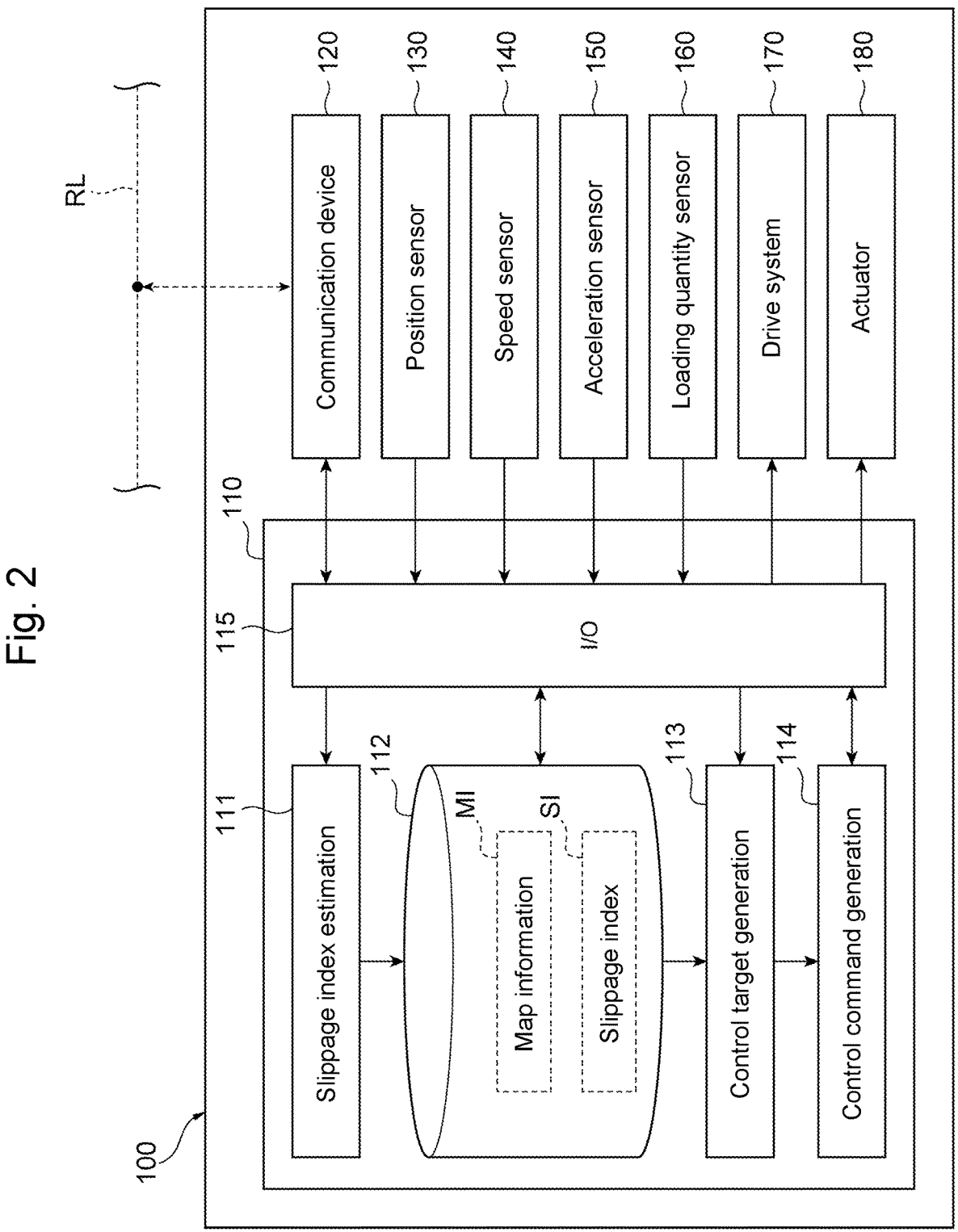
FIG. 2 is a functional block diagram of the hauling vehicle in FIG. 1.

The following describes a control system for hauling vehicle according to one embodiment of the present disclosure, with reference to the drawings. FIG. 1 is a schematic diagram of a control system 1 according to the present embodiment. FIG. 2 is a functional block diagram of the hauling vehicle 100 in FIG. 1.

For instance, the control system 1 of the present embodiment controls one or more hauling vehicles 100 traveling on an unpaved travel path WP at a work site such as an open-pit mine or a construction site. For instance, the control system 1 controls an unmanned hauling vehicle 100 without an operator or driver on board to autonomously travel. For instance, the control system 1 includes a controller 110 and a communication device 120 mounted on the hauling vehicle 100.

In the example in FIG. 1, the hauling vehicle 100 is a dump truck that transports earth and sand, ore, and other materials. The control target of the control system 1 is not limited to hauling vehicles 100 such as dump trucks, which may be other work machines such as wheel loaders and hydraulic excavators. As shown in FIG. 2, the hauling vehicle 100 includes the controller 110, the communication device 120, a position sensor 130, a speed sensor 140, an acceleration sensor 150, a loading quantity sensor 160, a drive system 170, and an actuator 180.

For instance, the controller 110 has a slippage index estimation section 111, a memory section 112, a control target generation section 113, a control command generation section 114, and an input/output section 115. Although not shown, the controller 110 may include a microcontroller or firmware including one or more processing devices such as a CPU and one or more storage devices such as ROM and RAM. For instance, the sections of the controller 110 shown in FIG. 2 represent the functions of the controller 110 that are implemented by executing a program stored in the storage device by the processing device.

For instance, the communication device 120 is a wireless communication device that is connected to the controller 110 via the input/output section 115 and communicates with the outside via a wireless communication line RL. Specifically, the communication device 120 communicates with a communication device 120 of another hauling vehicle 100 having a similar configuration to the hauling vehicle 100 shown in FIG. 2.

For instance, the position sensor 130 is connected to the controller 110 via the input/output section 115, and acquires position information of the hauling vehicle 100 and outputs it to the controller 110. For instance, the position sensor 130 may include a receiver for a global navigation satellite system (GNSS) mounted on each hauling vehicle 100.

For instance, the speed sensor 140 is connected to the controller 110 via the input/output section 115, and detects the speed of the hauling vehicle 100 and outputs it to the controller 110. For instance, the speed sensor 140 includes a wheel speed sensor. The speed sensor 140 may calculate the speed of the hauling vehicle 100 based on the time change of the position information of the hauling vehicle 100 acquired by the position sensor 130.

For instance, the acceleration sensor 150 is connected to the controller 110 via the input/output section 115, and detects the acceleration of the hauling vehicle 100 and outputs it to the controller 110. For instance, the acceleration sensor 150 may include an inertial measurement unit (IMU). The acceleration sensor 150 may calculate the acceleration of the hauling vehicle 100 based on the time change of the position information of the hauling vehicle 100 acquired by the position sensor 130.

For instance, the loading quantity sensor 160 is connected to the controller 110 via the input/output section 115, and detects the weight of the load carried on the hauling vehicle 100, that is, the loading quantity, and outputs it to the controller 110. For instance, the loading quantity sensor 160 measures the load acting on the suspension of the hauling vehicle 100 and the pressure of the hydraulic oil in the hydraulic cylinder to detect the loading quantity on the hauling vehicle 100.

For instance, the drive system 170 is connected to the controller 110 via the input/output section 115, and generates driving force to drive the hauling vehicle 100 based on a control command input from the controller 110. For instance, the drive system 170 includes an engine, a generator, a travel motor or hydraulic motor, wheels and belts mounted on the hauling vehicle 100.

For instance, the actuator 180 is connected to the controller 110 via the input/output section 115, and assists the driving of the hauling vehicle 100 in accordance with a control command input from the controller 110 or allows the hauling vehicle 100 to travel autonomously. For instance, the actuator 180 includes a brake operating actuator, an accelerator operating actuator, and a steering actuator.

Referring to FIGS. 3 to 6, the following describes the operation of the control system 1 according to the present embodiment.

Figure 3:
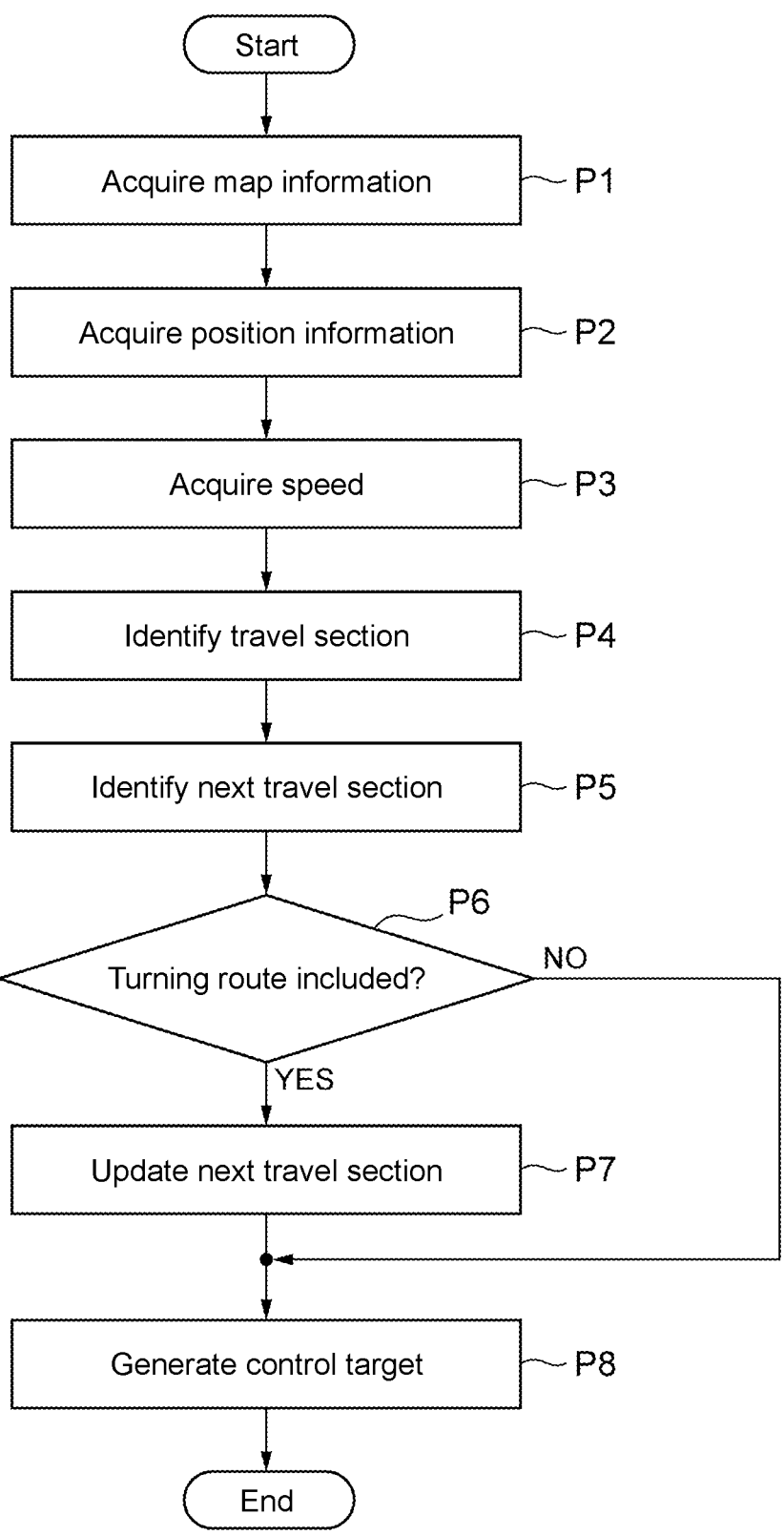
FIG. 3 is a flowchart of the control target generation process by the control system shown in FIG. 1.

FIG. 3 is a flowchart of the control target generation process by the control system 1 of the present embodiment. The control system 1 executes the process steps shown in FIG. 3, thus generating a control target, including a target route, at the controller 110 of each hauling vehicle 100. In the control system 1, first, the controller 110 mounted on each hauling vehicle 100 shown in FIG. 2 executes process P1 that makes the control target generation section 113 acquire map information MI stored in the memory section 112.

Figure 4:
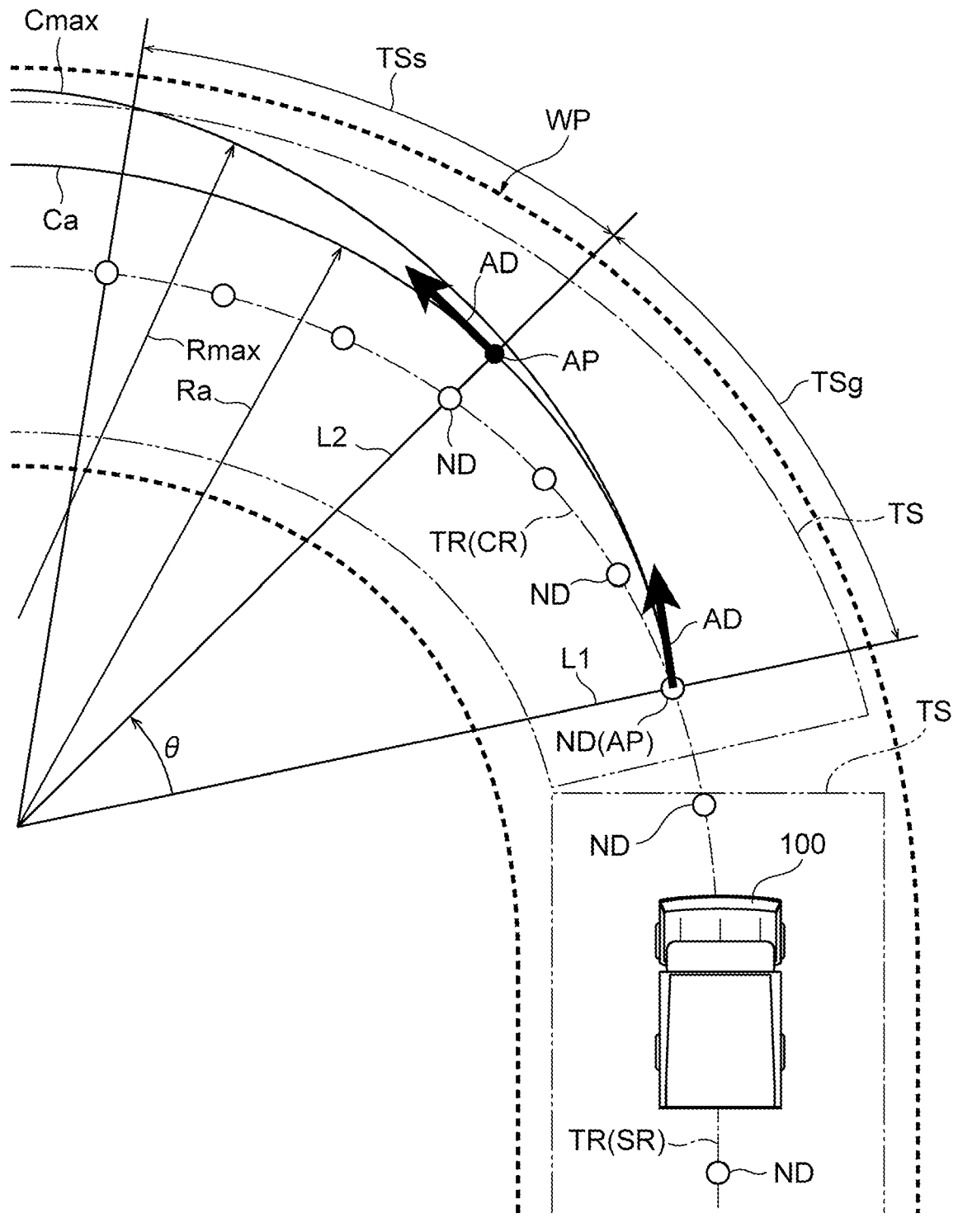
FIG. 4 is a plan view partially showing a travel path, on which the hauling vehicle shown in FIG. 1 travels.

FIG. 4 is a plan view of a portion of the travel path WP, along which the hauling vehicle 100 travels. For instance, the map information MI stored in the memory section 112 of the controller 110 includes information on the travel path WP, along which the hauling vehicle 100 travels and information on a plurality of travel sections TS obtained by dividing the travel path WP. For instance, the travel path WP is an unpaved road for the hauling vehicle 100 to travel at a work site such as an open-pit mine or a construction site.

For instance, a travel route TR of the hauling vehicle 100 is defined on the travel path WP. For instance, the travel route TR is an imaginary line passing through or near the center in the width direction of the travel path WP and extending along the travel path WP, and the travel route TR includes an arc or curved turning route CR and a straight route SR. The travel route TR has a plurality of nodes ND. For instance, the nodes ND are imaginary points placed at equal intervals on the travel route TR.

For instance, the turning routes CR and the straight routes SR included in the travel route TR can be classified based on a preset curvature threshold and the curvature of the travel route TR. In this case, the portion of the travel route TR whose curvature is equal to or greater than the threshold is classified as the turning route CR, and the portion whose curvature is less than the threshold is classified as the straight route SR.

For instance, the turning routes CR and the straight routes SR included in the travel route TR can be classified based on a preset threshold of lateral acceleration and the lateral acceleration acting on the hauling vehicle 100 traveling along the travel route TR. In this case, the portion of the travel route TR where the lateral acceleration acting on the hauling vehicle 100 is equal to or greater than the threshold is classified as the turning route CR, and the portion where the lateral acceleration is less than the threshold is classified as the straight route SR.

For instance, the travel path WP is divided into a plurality of travel sections TS. For instance, the travel path WP is divided so that each of the travel sections TS includes a plurality of nodes ND. In this case, each travel section TS includes at least one of the turning route CR and the straight route SR. For instance, the travel path WP may be divided into a travel section TS that includes only a turning route CR and a travel section TS that includes only a straight route SR. Table 1 below shows an example of the map information MI stored in the memory section 112 of the controller 110 mounted on each hauling vehicle 100.

TABLE 1

| Node ID | Travel section ID | Node information | Speed limit | Turning flag |
|---|---|---|---|---|
| 1 | 1 | (X1, Y1, D1) | V1 | 0 |
| 2 | 1 | (X2, Y2, D2) | V2 | 1 |
| 3 | 2 | (X3, Y3, D3) | V3 | 1 |
| . . . | . . . | . . . | . . . | . . . |
| n | m | (Xn, Yn, Dn) | Vn | 0 or 1 |
| . . . | . . . | . . . | . . . | . . . |

As shown in Table 1, the map information MI includes travel section IDs, node information, speed limits, and turning flags for the individual node IDs. A node ID is an identification number assigned to each node ND. For instance, the travel section ID is an identification number assigned to each travel section TS. Note that n and m in Table 1 each represent any natural number. For instance, the node information is the position coordinates of each node ND. For instance, the speed limit is determined based on the curvature of the travel route TR in each travel section TS. The turning flag is "0" when the node ND is located on a straight route SR, and is "1" when the node ND is located on a turning route CR.

In process P1 shown in FIG. 3, the control system 1 makes the control target generation section 113 of the controller 110 mounted on each hauling vehicle 100 shown in FIG. 2 obtain the map information MI shown in Table 1 from the memory section 112 of the controller 110. Next, the control system 1 executes process P2 to acquire the position information of each hauling vehicle 100 and process P3 to acquire the speed of each hauling vehicle 100.

Specifically, in process P2, the controller 110 of each hauling vehicle 100 acquires position information of the hauling vehicle 100 from the position sensor 130 mounted on the hauling vehicle 100. In process P3, the controller 110 of each hauling vehicle 100 obtains the speed of the hauling vehicle 100 from the speed sensor 140 mounted on the hauling vehicle 100.

Next, the control system 1 executes process P4 to identify the travel section TS where each of the hauling vehicles 100 is traveling. Specifically, in process P4, the controller 110 of each hauling vehicle 100 identifies the travel section ID based on the map information MI and the position information of the hauling vehicle 100 acquired in the previous process P1 and P2, and thus identifies the travel section TS in which the hauling vehicle 100 is traveling.

Next, the control system 1 executes process P5 to identify the next travel section TS for each of the hauling vehicles 100. Specifically, in process P5, the control target generation section 113 of each hauling vehicle 100 identifies the travel section ID of the travel section TS, on which the hauling vehicle 100 is traveling next, based on the map information MI, the speed, and the travel section TS where the hauling vehicle 100 is currently traveling that are acquired in the previous process P1, P3 and P4.

This allows the control target generation section 113 to identify a next travel section which is a travel section TS on which the hauling vehicle 100 is traveling next. This next travel section is a target for the control target generation section 113 to generate a control target. For instance, in this process P5, the control target generation section 113 of each hauling vehicle 100 identifies a region including one or more next travel sections that the hauling vehicle 100 will enter within a predetermined time.

Next, the control system 1 executes process P6 to determine whether or not the next travel section includes a turning route CR. Specifically, in process P6, the control system 1 makes the control target generation section 113 of each hauling vehicle 100 acquire the map information MI of the next traveling section from the memory section 112 and determines whether or not the travel section TS where each hauling vehicle 100 is traveling next includes a turning route CR.

Specifically, in process P6, the control target generation section 113 determines, based on the acquired map information MI, whether or not the travel section TS, which is the next travel section, includes a node ND with turning flag of "1".

In this process P6, if the travel section TS, which is the next travel section, does not include a node ND with turning flag of "1", then the control target generation section 113 determines that the next travel section does not include a turning route CR (NO), that is, determines that the next travel section is a straight route SR. In this case, the control target generation section 113 does not execute process P7 to update the next travel section, and executes process P8 to generate a control target from the map information MI on the next travel section. This process P8 is described later.

In process P6, if the travel section TS, which is the next travel section, includes a node ND with turning flag of "1", then the control target generation section 113 determines that the next travel section includes a turning route CR (YES), and executes the process P7 to update the next travel section.

FIG. 5 is a flowchart of the process P7 to update a next travel section shown in FIG. 3. When the process P7 starts, the control target generation section 113 first executes process P701 to calculate the initial value of the target speed for the next travel section. In this process P701, the control target generation section 113 calculates, based on the map information MI, the average value of the speed limits of the plurality of nodes ND included in the next travel section, that is, the travel section TS where the vehicle is traveling next, as the initial value of the target speed.

Next, the control target generation section 113 executes process P702 to acquire the loading quantity on the hauling vehicle 100, i.e., the weight of the load carried on the hauling vehicle 100, from the loading quantity sensor 160 via the input/output section 115.

Next, the controller 110 of each hauling vehicle 100 executes process P703 to acquire the state of the travel path WP. In this process P703, the slippage index estimation section 111 of the controller 110 estimates at least one of the coefficient of friction between the ground-contact part, such as a tire or a crawler track of the hauling vehicle 100 and the travel path WP, and the moisture content of the travel path WP, as the state of the travel path WP. Here, the slippage index estimation section 111 estimates at least one of the friction coefficient and the moisture content by any of the following methods, for example.

The coefficient of friction between the ground-contact part of the hauling vehicle 100 and the travel path WP affects the magnitude of the force that the ground-contact part of the hauling vehicle 100 receives from the travel path WP during travel, and thus changes the motion of the hauling vehicle 100 during travel. Therefore, the speed, acceleration, and loading quantity of the hauling vehicle 100 may be acquired from the speed sensor 140, the acceleration sensor 150, and the loading quantity sensor 160, and then the coefficient of friction can be calculated by the equation of motion using these weight including the loading quantity, speed, and acceleration of the hauling vehicle 100.

The moisture content in the travel path WP affects the coefficient of friction between the ground-contact part of the hauling vehicle 100 and the travel path WP. Specifically, when the moisture content in the travel path WP increases, the travel path WP becomes muddy and thus the coefficient of friction between the ground-contact part of the hauling vehicle 100 and the travel path WP decreases. Therefore, similarly to the coefficient of friction, the moisture content of the travel path WP may be estimated based on the equation of motion using the weight including the loading quantity, speed, and acceleration of the hauling vehicle 100.

The moisture content of the travel path WP may be estimated from the precipitation and humidity included in the weather information acquired via the communication device 120. Also, the moisture content of the travel path WP may be estimated from the amount of water sprinkled on the travel path WP that may be acquired via the communication device 120. These methods allow a hauling vehicle 100 without sensors such as speed sensor 140, acceleration sensor 150, and loading quantity sensor 160 to estimate the moisture content of the travel part WP.

Next, the controller 110 of each hauling vehicle 100 executes process P704 to estimate a slippage index SI. The slippage index SI is an indicator of the slipperiness of the hauling vehicle 100 traveling on the travel path WP. A hauling vehicle 100 traveling on the travel path WP becomes more slippery as the slippage index SI becomes smaller and it becomes more grippy as the slippage index SI becomes larger. In this process P704, the controller 110 makes the slippage index estimation section 111 estimate the slippage indexes SI of a plurality of nodes ND based on the state of the travel path WP obtained in the previous process P703, for example.

Specifically, in process P704, the slippage index estimation section 111 sets the coefficient of friction μ between the ground-contact part of the hauling vehicle 100 and the travel path WP obtained in the previous process P703, as the slippage index SI, for example. In this case, the slippage index SI has a positive correlation with the friction coefficient μ of the travel path WP. In the process P704, the slippage index estimation section 111 calculates the reciprocal of the moisture content of the travel path WP obtained in the previous process P703 as the slippage index SI, for example. In this case, the slippage index SI has a negative correlation with the moisture content of the travel path WP.

For instance, as shown in Table 2 below, the slippage index estimation section 111 stores the slippage index SI set or calculated in the process P704 for each of the node IDs corresponding to a plurality of nodes ND, together with the setting or calculated time, in the memory section 112.

TABLE 2

| Node ID | Slippage index | Time |
|---------|----------------|------|
| 1 | μ1 | T1 |
| 2 | μ2 | T2 |
| 3 | μ3 | T3 |
| . . . | . . . | . . . |
| n | μn | Tn |
| . . . | . . . | . . . |

The plurality of hauling vehicles 100 share the latest slippage index SI stored in the memory section 112 of each of their controllers 110. For instance, the slippage index estimation section 111 acquires the slippage index SI at the latest time for each node ID from the controller 110 of another hauling vehicle 100 via the input/output section 115 and the communication device 120. The slippage index estimation section 111 then stores the slippage index SI at the latest time obtained from the other hauling vehicle 100 in the memory section 112 together with the time.

Next, the controller 110 of each hauling vehicle 100 executes process P705 to divide the next travel section. In this process P705, the controller 110 makes the control target generation section 113 acquire the slippage index SI corresponding to each of the node IDs of the plurality of nodes ND included in the travel section TS where the vehicle is traveling next, from the memory section 112. The control target generator 113 then divides the next travel section TS into a plurality of sub-sections based on the acquired slippage index SI for each node ID.

Figure 6:
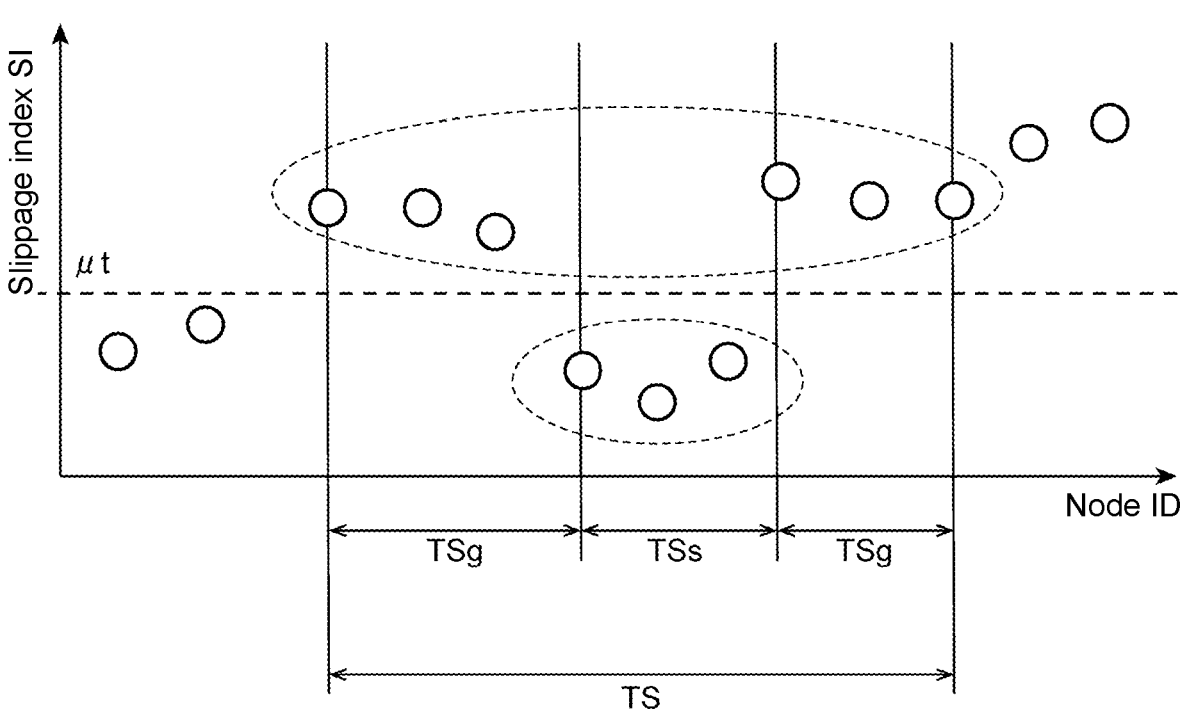
FIG. 6 is a graph showing an example of how to divide the next travel section into multiple sub-sections.

FIG. 6 is a graph showing an example of how to divide the next travel section into multiple sub-sections based on the slippage index SI for each node ID. In the graph shown in FIG. 6, the horizontal axis represents the node ID of each of the plurality of nodes ND, and the vertical axis represents the slippage index SI. Then, the section in which the nodes ND with the slippage index SI smaller than threshold μt are present continuously is defined as the "slippery sub-section TSs", and the section in which the nodes ND with the slippage index SI equal to or greater than the threshold μt are present continuously is defined as the "grippy sub-section Tsg", thus dividing the travel section TS as the next travel section into a plurality of sub-sections.

For instance, a preset value can be used as the threshold μt of the slippage index SI. For instance, the threshold μt of the slippage index SI may be determined so as to simultaneously satisfy the following first and second conditions. For instance, the first condition is that the sum of the variance or standard deviation of the slippage indexes SI in the slippery sub-section TSs and the variance or standard deviation of the slippage indexes SI in the grippy sub-section TSg is minimized. The second condition is that the difference between the average value of the slippage indexes SI for the entire slippery sub-section TSs and the average value of the slippage indexes SI for the entire grippy sub-section TSg is maximized.

Next, the controller 110 of each hauling vehicle 100 executes process P706 to calculate the entry position and direction into the sub-section TSg where the hauling vehicle 100 first enters in the next travel section, for example. As shown in FIG. 4, for example, the control target generation section 113 of the controller 110 obtains the coordinates of the first node ND of the travel section TS where the hauling vehicle 100 is traveling next as the entry position AP into the first entry sub-section TSg. The control target generation section 113 also calculates the entry direction AD from the last node ND in the travel section TS where the hauling vehicle 100 is currently traveling to the node ND at the entry position AP in the next travel section, as the entry direction into the first entry sub-section TSg.

Next, the control target generation section 113 of the controller 110 in each hauling vehicle 100 executes process P707 to set a variable k, which is an index of a plurality of sub-sections TSg, TSg, at 1 (k=1). Next, the control target generation section 113 executes process P708 to calculate the radius of curvature of the travel route TR that the hauling vehicle 100 can follow in the first (kth) sub-section TSg, that is, the trackable turning radius Ra.

In this process P708, the control target generation section 113 calculates the trackable turning radius Ra of the kth sub-sections TSg, TSs in the next travel section based on the target speed, loading quantity, and slippage index SI calculated in the previous process P701, P702, and P704. Specifically, for example, the control target generation section 113 calculates the maximum lateral acceleration a of the hauling vehicle 100 during travel from the average value of the slippage indexes SI of the multiple nodes ND included in the first sub-section TSg of the next travel section and the weight of the hauling vehicle 100 including the loading quantity. Next, the control target generation section 113 calculates the trackable turning radius Ra using the maximum lateral acceleration a and the target speed V, in accordance with the following equation (1):

$$Ra=V^2/a \qquad (1)$$

Next, the control target generation section 113 executes process P709 to calculate the maximum value of the radius of curvature of the travel route TR that the hauling vehicle 100 can travel in the travel path WP in the first (kth)

sub-section TSg, that is, the maximum allowable turning radius Rmax. For instance, the control target generation section 113 calculates the maximum allowable turning radius Rmax by the following procedure.

First, as shown in FIG. 4, the control target generation section 113 calculates a straight line L1 passing through the node ND, which is the entry position to the first sub-section TSg in the next travel section, and perpendicular to the entry direction AD. Then, the control target generation section 113 calculates the radius of the arc Cmax so that the arc centered on the straight line L1 inside the turn of the hauling vehicle 100 touches the outer boundary of the curve of the travel path WP. The radius of this arc Cmax is calculated as the maximum allowable turning radius Rmax of the first sub-section TSg.

Next, the control target generation section 113 executes process P710 to determine whether the trackable turning radius Ra is less than or equal to the maximum allowable turning radius Rmax in the first (kth) sub-section TSg. If it is determined in this process P710 that the trackable turning radius Ra is less than or equal to the maximum allowable turning radius Rmax, the control target generation section 113 executes process P711 to determine whether the variable k is equal to the total number N of sub-sections TSs and TSg in the next travel section.

If it is determined in this process P711 that the variable k is not equal to the total number N of sub-sections TSs and TSg in the next travel section (NO), the control target generation section 113 executes the next process P712. In this process P712, the control target generation section 113 calculates the entry position AP and entry direction AD of the hauling vehicle 100 to the next sub-section, that is, the second (k+1)th sub-section TSs where the hauling vehicle 100 is traveling next.

In this process P712, as shown in FIG. 4, for example, the control target generation section 113 acquires a straight line L1 passing through the node ND, which is the entry position AP to the first (kth) sub-section TSg, and perpendicular to the entry direction AD to this sub-section TSg. Further, the control target generation section 113 obtains an arc Ca with node ND at the entry position AP of the first (kth) sub-section TSg as the endpoint, having its center on the straight line L1, and with radius that is the trackable turning radius Ra of the first (kth) sub-section TSg.

Further, the control target generation section 113 obtains a straight line L2 that has a center angle θ of the arc Ca with the straight line L1 and passes through the center of arc Ca and the first node ND of the second (k+1th) sub-section TSs. Then, the control target generation section 113 sets the intersection of this straight line L2 and the arc Ca as the entry position AP of the second (k+1th) sub-section TSs, and calculates the tangent direction of the arc Ca at this entry position AP as the entry direction AD to the second (k+1th) sub-section TSs.

Next, the control target generation section 113 executes process P713 to increment the variable k by setting k=k+1, and then executes process P708 to P710 to the second (k+1th) sub-section TSs, the next sub-section, in the same way as to the first (kth) sub-section TSg.

If it is determined in process P710 that the trackable turning radius Ra is greater than the maximum allowable turning radius Rmax and the trackable turning radius Ra is not less than or not equal to the maximum allowable turning radius Rmax (NO), the control target generation section 113 executes process P714 to reduce the target speed. In this process P714, the control target generation section 113 reduces the target speed at a preset rate, for example.

In the process P714, the control target generation section 113 may calculate the reduced target speed V in accordance with the following equation (2) using the maximum allowable turning radius Rmax and the maximum lateral acceleration a.

$$V=(a \cdot \text{Rmax})^{1/2} \qquad (2)$$

This process P714 to reduce the target speed V is executed when the result of process P710 indicates that the trackable turning radius Ra is not less than or not equal to the maximum allowable turning radius Rmax (NO). Therefore, the target speed V calculated in process P714 is smaller than the target speed V when the trackable turning radius Ra is calculated in process P708. After the process P714 ends, the control target generation section 113 returns to the process P707. As a result, the control target generation section 113 repeats the process P708 and onward for the 1st to Nth sub-sections TSg, TSs of the next travel section again using the new target speed V.

When completing the process P708 and onward for all of the N sub-sections TSg and TSs of the next travel section, the control target generation section 113 determines in process P711 that the variable k is equal to N (YES), and executes process P715 to generate route information for the next travel section. In this process P715, the control target generation section 113 generates the route information for the next travel section, including the trackable turning radius Ra and target speed V for all sub-sections TSg and TSs from the first to the Nth in the next travel section.

The trackable turning radius Ra and target speed V for all the sub-sections TSg, TSs included in the route information for the next travel section are calculated based on the slippage index SI for each of the sub-sections TSg, TSs, as described above. Thus, the control target generation section 113 sets a larger turning radius of the turning route CR included in the target route in the slippery sub-section TSs of the travel section TS where the slippage index SI is less than the predetermined threshold μt than in the grippy sub-section TSg where the slippage index SI is equal to or greater than the predetermined threshold μt. This allows the hauling vehicle 100 traveling in accordance with the route information of the next travel section to pass through the next travel section at the maximum speed that can prevent slipping.

Assuming that the maximum target speed that prevents the hauling vehicle 100 from slipping is the maximum target speed, the trackable turning radius Ra of each of the sub-sections TSg and TSs at target speeds lower than the maximum target speed is calculated as follows. The target speed smaller than the maximum target speed can be calculated based on the maximum lateral acceleration a, at which the hauling vehicle 100 traveling in the sub-sections TSg, TSs does not slip. For instance, the maximum lateral acceleration a in each sub-section TSg, TSs is determined based on the weight including the loading quantity of the hauling vehicle 100 and the average value of the slippage indexes SI in the sub-sections TSg, TSs.

The smaller the target speed, the smaller the trackable turning radius Ra. Therefore, the minimum target speed can be set so that the hauling vehicle 100 traveling along the trackable turning radius Ra touches the inner boundary of the curve of the travel path WP and does not cross the inner boundary of the curve of the travel path WP. For instance, the control target generation section 113 calculates route information including a combination of the target speed and the trackable turning radius Ra within the range from the minimum target speed to the maximum target speed.

For instance, the control target generation section 113 calculates the length of the travel route TR of each of the sub-sections TSg and TSs in the next travel section as the arc length, based on the calculated route information of the next travel section and the map information MI acquired from the memory section 112. For instance, the control target generation section 113 also calculates the passage time in each of the sub-sections TSg and TSs from the calculated length of the travel route TR of each of the sub-sections TSg and TSs and the target speed, and totals them, thus calculating the passage time of the next travel section.

As described above, the route information for the next travel section that the control target generation section 113 calculates in process P715 may be the route information that the hauling vehicle 100 passes through the next travel section in the shortest possible time, or it may be the route information that the hauling vehicle 100 passes through the next travel section in a preset passage time that is longer than the shortest possible time. In other words, the control target generation section 113 generates a control target that allows the hauling vehicle 100 to pass through the travel section TS in the shortest possible time according to the slippage index SI. The control target generation section 113 also generates a control target that allows the hauling vehicle 100 to pass through the travel section TS in a set time.

Next, the control target generation section 113 executes process P716 to update the map information MI for the next travel section based on the map information MI and the route information on the next travel section. For instance, the control target generation section 113 calculates an arc for each of the sub-sections TSg and TSs of the next travel section, and updates the travel route TR by connecting those arcs as the new travel route of the next travel section. The control target generation section 113 updates the location information of nodes ND based on the updated travel route, and updates the map information MI for the next travel section based on the updated location information of the nodes ND.

For instance, the arcs of the sub-sections TSg and TSs used for updating the travel route TR are calculated as follows. That is, the arcs are calculated so as to have the endpoint at the entry position AP to the sub-sections TSg and TSs, have the center on the straight line perpendicular to the entry direction AD to the sub-sections TSg and TSs and inside the curve of the travel path WP, and have the radius that is the trackable turning radius Ra of the sub-sections TSg and TSs. Each arc of the sub-sections TSg, TSs has a central angle θ between the first node ND of the sub-section TSg, TSs and the first node ND of the next sub-section TSg, TSs.

Then, the process P7 of updating the next travel section shown in FIG. 5 completes. After that, the control target generation section 113 executes process P8 to generate a control target shown in FIG. 3.

In process P8, the control target generation section 113 generates a control target that includes, for example, the average value of the speed limits of nodes ND included in the next travel section as the target speed and the travel route TR or the location information of the nodes ND as the target route.

If the next travel section includes a node ND whose turning flag is "1", that is, when the next travel section includes a turning route CR, the control target generation section 113 may generate the following control target in the process P8, for example. For instance, the control target generation section 113 generates a control target that includes a target speed with a speed distribution that decelerates the hauling vehicle 100 before the hauling vehicle 100 enters the turning route CR and accelerates it after the hauling vehicle 100 exits the turning route CR. This stabilizes the speed of the hauling vehicle 100 traveling on the turning route CR, suppresses the acceleration in the front-rear direction of the hauling vehicle 100 during turning, and makes it possible to control the hauling vehicle 100 more easily.

Then, the control target generation process shown in FIG. 3 completes. After that, the control command generation section 114 shown in FIG. 2 generates a control command to make the hauling vehicle 100 travel autonomously or to assist the operation of the hauling vehicle 100, based on the control target generated by the control target generation section 113 through the control target generation process described above. For instance, this control command includes at least one of the brake pedal operation amount, accelerator pedal operation amount, and steering angle operation amount of the actuator 180.

The following describes the action of the control system 1 for hauling vehicle according to the present embodiment.

The hauling vehicle 100, for example, travels along a given target route such as a travel route TR without an operator or driver on board, and if the travel trajectory that the hauling vehicle 100 actually traveled deviates from the target route by a certain distance or more, the hauling vehicle 100 determines as a route deviation and stops. The stopping of the hauling vehicle 100 leads to a decrease in operating time, which is a factor in lowering productivity. An off-road such as the travel path WP in a mine often deteriorates in the condition due to mud and the like, and the deterioration of the condition of the travel path WP degrades the followability of the hauling vehicle 100 that relates to the travel trajectory that the hauling vehicle 100 actually traveled relative to the target route. Therefore, if the condition of the travel path WP deteriorates due to water spraying or other factors, the number of times the hauling vehicle 100 deviates from the target path may increase.

The control system 1 for hauling vehicle of the present embodiment causes the hauling vehicle 100 to travel based on the control target including the target route, as described above. The control system 1 generates a control target based on the map information MI, which includes information on the travel path WP, along which the hauling vehicle 100 travels, and information on a plurality of travel sections TS obtained by dividing the travel path WP, the loading quantity on the hauling vehicle 100 in each travel section TS, and a slippage index SI indicating the slipperiness of the travel path WP in each travel section TS. If the slippage index SI of at least one travel section TS is less than the predetermined threshold μt, the control system 1 sets a larger turning radius of the turning route CR included in the target route for that travel section TS than for the case where the slippage index SI is equal to or greater than the predetermined threshold μt.

With this configuration, the control system 1 for hauling vehicle of this embodiment suppresses the slipping of the hauling vehicle 100 while suppressing the reduction of the travel speed of the hauling vehicle 100. Specifically, when generating a control target for hauling vehicle 100 based on the map information MI, the loading quantity of the hauling vehicle 100, and the slippage index SI, the control system 1 identifies the slippery travel section TS based on the slippage index SI. In the slippery travel section TS, the control system 1 increases the turning radius of the turning route CR included in the target route of the travel section TS, thereby reducing the lateral acceleration acting on the hauling vehicle 100 and thus suppressing the slipping while suppressing the decrease in travel speed of the hauling vehicle 100. Therefore, the control system 1 prevents the hauling vehicle 100 from deviating from the travel route TR and improves the working efficiency of the hauling vehicle 100.

In the control system 1 for hauling vehicle of the present embodiment, the slippage index SI has a positive correlation with the friction coefficient μ of the travel path WP. With this configuration, the control system 1 determines that the travel path WP is in a slippery state when the slippage index SI is below the threshold μt.

In the control system 1 for hauling vehicle of the present embodiment, the slippage index SI has a negative correlation with the moisture content of the travel path WP. With this configuration, the control system 1 determines the slipperiness of the travel path WP based on the moisture content in the travel path WP, and simplifies its configuration without requiring a special sensor.

In the control system 1 for hauling vehicle of the present embodiment, the control target further includes a target speed corresponding to the target route. The control system 1 also generates a control target for the hauling vehicle 100 to let the hauling vehicle 100 pass through the travel section in the shortest possible time according to the slippage index SI. With this configuration, the control system 1 more effectively suppresses the speed reduction of the hauling vehicle 100.

The control system 1 for hauling vehicle of the present embodiment also generates a control target for the hauling vehicle 100 to let the hauling vehicle 100 pass through the travel section TS in a set time. With this configuration, the control system 1 prevents the speed of the hauling vehicle 100 from increasing more than necessary, allowing the hauling vehicle 100 to travel more safely.

In the control system 1 of the present embodiment, the control target may include a speed target that decelerates the hauling vehicle 100 before the hauling vehicle 100 enters the turning route CR and accelerates the hauling vehicle 100 after the hauling vehicle 100 exits the turning route CR. This configuration allows the hauling vehicle 100 to travel more stably.

The control system 1 for hauling vehicle of the present embodiment include the position sensor 130 to acquire the position information of the hauling vehicle 100, the loading quantity sensor 160 to acquire the loading quantity on the hauling vehicle 100, the speed sensor 140 to acquire the speed of the hauling vehicle 100, and the acceleration sensor 150 to acquire the acceleration of the hauling vehicle 100. Then, the control system 1 estimates the slippage index SI corresponding to the position information based on the loading quantity, speed, and acceleration corresponding to the position information of the hauling vehicle 100. This configuration improves the estimation accuracy of the slippage index SI corresponding to the position information of the travel path WP and suppresses slippage of the hauling vehicle 100 more reliably.

In the control system 1 for hauling vehicle of the present embodiment, a plurality of hauling vehicles 100 share the slippage index SI estimated based on the position information, loading quantity, speed, and acceleration in each of the hauling vehicles 100. This configuration allows the multiple hauling vehicles 100 to each generate a control target using the latest slippage index of the travel path WP, which more reliably prevents the hauling vehicles 100 from slowing down and more reliably prevents the hauling vehicles 100 from slipping.

Figure 7:
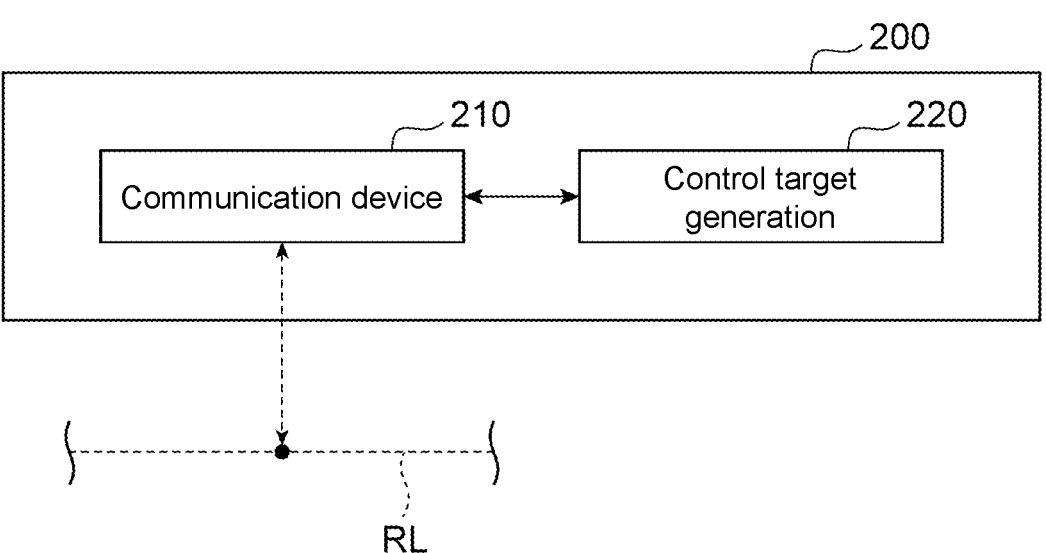
FIG. 7 is a block diagram of a modified example of the control system shown in FIG. 1.

FIG. 7 is a block diagram showing a modified example of the control system 1 for hauling vehicle of the above-described embodiment. In this modified example, the control system 1 further includes a control station 200 that receives the slippage index SI from each of the hauling vehicles 100 and transmits the control targets to the multiple hauling vehicles 100, in addition to the configuration described above. In this modified example, the control station 200 includes a communication device 210 and a control target generation section 220. Similar to the controller 110 of the hauling vehicle 100, the control target generation section 220 may include a computer such as a microcontroller.

For instance, the control station 200 controls to allocate one hauling vehicle 100 exclusively to each travel section TS in order to avoid interference among a plurality of unmanned hauling vehicles 100 without an operator or driver on board. As disclosed in Japanese Patent No. 6368259, for instance, the control station 200 closes the travel route TR on which the hauling vehicle 100 is present, thus prohibiting the entry of a different hauling vehicle 100, and avoiding interference among the hauling vehicles 100.

The control station 200 makes the communication device 210 receive the slippage index SI from each of the hauling vehicles 100 via the wireless communication line RL. The control station 200 makes the control target generation section 220 generate a control target based on the slippage index SI and transmits the generated control target to the controller 110 of each hauling vehicle 100. In this modified example, the control target generation section 113 can be omitted in the controller 110 of the hauling vehicle 100.

For the control target generation section 220 of the control station 200, a computer can be used, which is capable of performing calculations with a higher load than the controller 110 mounted on the hauling vehicle 100 and having limited power and space. The control station 200 therefore uses all the travel routes TR that can be obtained based on where the hauling vehicles 100 pick up the load and where they discharge its load, and generates a control target allowing multiple hauling vehicles 100 to travel in the shortest possible time based on the condition of the travel path WP. This generates a control target from start to stop for multiple hauling vehicles 100, allowing the control to estimate the position of each hauling vehicle 100 over time and to avoid expected interference of the hauling vehicles 100.

According to this modified example, the control target generation section 220 of the control station 200 generates a control target for a plurality of hauling vehicles 100 based on the locations where the hauling vehicles 100 pick up and discharge their loads. Then the multiple hauling vehicles 100 can travel safely in the shortest possible time based on the condition of the travel path WP, i.e., the slippage index SI.

That is a detailed description of the embodiments of the control system for hauling vehicle of the present disclosure, with reference to the drawings. The specific configuration of the present disclosure is not limited to the above-stated embodiments, and the design may be modified variously without departing from the spirits of the present disclosure. The present disclosure also covers such modified embodiments.

REFERENCE SIGNS LIST

1 Control system
100 Hauling vehicle
130 Position sensor
140 Speed sensor
150 Acceleration sensor 160 Loading quantity sensor
200 Control station
CR Turning route
MI Map information
SI Slippage index
TS Travel section
WP Travel path
μ Friction coefficient
μt Threshold

The invention claimed is:

1. A control system for hauling vehicle that causes a hauling vehicle to travel based on a control target including a target route and a target speed corresponding to the target route, the control system acquiring map information, which includes information on a travel path, along which the hauling vehicle travels, and information on a plurality of travel sections obtained by dividing the travel path; position information on the hauling vehicle; and speed of the hauling vehicle, and identifying the travel section, along which the hauling vehicle is traveling, and a next travel section that is the travel section, along which the hauling vehicle is traveling next;

if the control system determines based on the map information that the next travel section includes a turning route, calculating, based on the map information, an average value of speed limits of a plurality of nodes included in the next travel section as the target speed;

acquiring a loading quantity on the hauling vehicle and a slippage index indicating slipperiness of each of the plurality of nodes;

dividing the next travel section into a plurality of sub-sections based on the slippage index for each node;

calculating an entry position and entry direction of the hauling vehicle to each of the plurality of sub-sections;

calculating a trackable turning radius, which is a radius of curvature of a travel route that the hauling vehicle can follow, for each of the sub-sections of the hauling vehicle in each of the sub-sections based on the target speed, the loading quantity, and the slippage index;

calculating a maximum allowable turning radius, which is a maximum value of a radius of curvature of a travel route that the hauling vehicle can travel in the travel path, for each of the sub-sections for each of the sub-sections based on the entry position and entry direction;

if the trackable turning radius is less than or equal to the maximum allowable turning radius in each of the sub-sections, setting a turning radius of a turning route included in the target route as the trackable turning radius in each of the sub-sections, whereby the turning radius of the turning route in the sub-section where the slippage index is less than a predetermined threshold is set larger than the turning radius of the turning route in the sub-section where the slippage index is equal to or greater than the predetermined threshold to an extent that the turning route does not exceed an outer boundary of a curve of the travel path; and control the hauling vehicle to travel along the turning route based on the set turning radius; and if the trackable turning radius is greater than the maximum allowable turning radius in each of the sub-sections, reducing the target speed until the trackable turning radius is less than or equal to the maximum allowable turning radius in all of the sub-sections; and control the hauling vehicle based on the reduced target speed.

2. The control system for hauling vehicle according to claim 1, wherein the slippage index has a positive correlation with a friction coefficient of the travel path.

3. The control system for hauling vehicle according to claim 1, wherein the slippage index has a negative correlation with moisture content of the travel path.

4. The control system for hauling vehicle according to claim 1, wherein the control system generates the control target that allows the hauling vehicle to pass through the travel section in a shortest possible time according to the slippage index.

5. The control system for hauling vehicle according to claim 4, wherein the control system generates the control target to let the hauling vehicle pass through the travel section in a set time.

6. The control system for hauling vehicle according to claim 1, wherein the control target includes a speed target that decelerates the hauling vehicle before the hauling vehicle enters the turning route and accelerates the hauling vehicle after the hauling vehicle exits the turning route.

7. The control system for hauling vehicle according to claim 1, further comprising: a position sensor that acquires position information of the hauling vehicle, a loading quantity sensor that acquires the loading quantity on the hauling vehicle, a speed sensor that acquires speed of the hauling vehicle, and an acceleration sensor that acquires acceleration of the hauling vehicle, wherein the control system estimates the slippage index corresponding to the position information based on the loading quantity, the speed, and the acceleration corresponding to the position information.

8. The control system for hauling vehicle according to claim 7, wherein a plurality of the hauling vehicles share the slippage index that each hauling vehicle estimates based on the position information, the loading quantity, the speed, and the acceleration.

9. The control system for hauling vehicle according to claim 8, further comprising a control station configured to receive the slippage index from each of the hauling vehicles and transmit the control targets to the plurality of hauling vehicles.

10. The control system for hauling vehicle according to claim 1, wherein the control system controls the turning route based on a combination of the target speed and the trackable turning radius with a range from a minimum target speed to a maximum target speed.

11. The control system for hauling vehicle according to claim 10, wherein the control system controls the target speed to be smaller than the maximum target speed based on a maximum lateral acceleration calculated from at least the slippage index.

* * * * *